US007228352B1

(12) United States Patent
Yaguchi et al.

(10) Patent No.: US 7,228,352 B1
(45) Date of Patent: Jun. 5, 2007

(54) DATA ACCESS MANAGEMENT SYSTEM IN DISTRIBUTED PROCESSING SYSTEM

(75) Inventors: Toshihiko Yaguchi, Kawasaki (JP); Mamoru Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 09/685,615

(22) Filed: Oct. 10, 2000

(30) Foreign Application Priority Data

Dec. 27, 1999 (JP) .................................. 11-371088

(51) Int. Cl.
G06F 15/16 (2006.01)
G06F 11/00 (2006.01)
(52) U.S. Cl. ........................................ 709/229; 714/15
(58) Field of Classification Search ........ 709/201–253; 714/15, 19
See application file for complete search history.

(56) References Cited

U.S. PATENT DOCUMENTS

| 4,819,159 | A | * | 4/1989 | Shipley et al. ................. 714/19 |
| 5,175,852 | A | * | 12/1992 | Johnson et al. ................. 707/8 |
| 5,999,930 | A | * | 12/1999 | Wolff ............................ 707/8 |
| 6,003,075 | A | * | 12/1999 | Arendt et al. ................ 709/221 |
| 6,260,069 | B1 | * | 7/2001 | Anglin ........................ 709/229 |
| 2001/0042075 | A1 | * | 11/2001 | Tabuchi ...................... 707/500 |

FOREIGN PATENT DOCUMENTS

JP        9023582        1/1997

* cited by examiner

*Primary Examiner*—David Wiley
*Assistant Examiner*—George Neurauter, Jr.
(74) *Attorney, Agent, or Firm*—Greer, Burns & Crain, Ltd.

(57) ABSTRACT

A data access management system in a distributed processing system capable of immediately restoring the system as a whole, has computers connected to each other via LAN, and a secondary storage device to which the computers are connected via data transfer paths. An access control subsystem for executing a data access to the secondary storage device is executed on each of the computers. A file management subsystem for giving an authority for writing the data to each access control subsystem, is executed on specified computer. When the file management subsystem transmits, to a certain access control subsystem, access control information indicating the authority for writing the data to a specified block on the secondary storage device, the same access control information is saved in the transmitted-side access control subsystem, and its record is retained in the file management subsystem. If the file management subsystem falls into a process-down, a standby file management subsystem is determined to become a new file management subsystem. Then this standby file management subsystem requests each of the access control subsystems to notify of the access control information saved by each of the access control subsystems.

8 Claims, 9 Drawing Sheets

DATA ACCESS MANAGEMENT SYSTEM IN DISTRIBUTED PROCESSING SYSTEM

BACKGROUND OF THE INVENTION

1. Field of the Invention

The present invention relates to a data access management system for managing an access to a file on a shared disk in a distributed processing system in which each of a plurality of computers in a network environment is capable of directly controlling the shared disk.

2. Related Background Art

A distributed processing system in which processes are distributed to a plurality of computers is provided for a UNIX system. This type of distributed processing system must keep a consistency (matching characteristic) of the data to be processes by the respective computers as the whole distributed processing system, and hence it is undesirable that two or more pieces of the same data exist within the distributed processing system. Accordingly, a disk for storing the data existing in a unique location within the distributed processing system is required to be what is accessible from each of the computers. Further, with a spread of the Internet and a trend of information-oriented society over the recent years, it is required that the computers share the information with each other.

For this purpose, there is actualized a shared file system for sharing one single disk or a plurality of disks (which will hereinafter be referred to as a "shared disk") physically or logically distributed between the respective computers within the distributed processing system. For example, the plurality of computers are connected to each other via a network and further connected to one single shared disk via SAN (Storage Area Network), thereby actualizing the shared file system in such a form that the data within the shared disk are accessed directly from the computers not via the network but via SAN.

It is required that this shared file system be constructed so that one piece of data is visible at the same time from the plurality of computers. On the other hand, while a certain computer is updating a certain piece of data, this piece of data must be locked (unaccessible from) to other computers. Such a control of inhibiting reference to the data to which one computer is executing writing process from other computers is known as "exclusive access control".

Several methods for exclusive access control have hitherto been actualized. Hereinafter, one of them is briefly explained. According to this exclusive access control method, an access-oriented subsystem receiving a data access request from an application to undertake the access to the shared file system is executed on each of the plurality of computers connected to each other via the network, and a management-oriented subsystem for giving an authority for accessing to the access-oriented subsystem on each computer is executed on one specified computer among the plurality of computers. Then, the access-oriented subsystem, upon receiving the data access request from the application on a certain computer, inquires the management-oriented subsystem whether the data are accessible. The management-oriented subsystem receiving this inquiry distinguishes type of the requested data access. Then, in case the requested data access is categorized as data reading, it issues a read-only token indicating the authority for reading objective data to the inquiring access-oriented subsystem, as far as the access-oriented subsystems of other computers do not execute writing process to the same data. On the contrary, in case the requested data access is categorized as data writing, the management-oriented subsystem issues a write-only token indicating the authority for writing the objective data to the inquiring access-oriented subsystem, as far as the access-oriented subsystems of other computers do not execute reading nor writing process to the same data. With this contrivance, the exclusive access control for inhibiting the access to the data being updated by the one computer from other computers is actualized.

This exclusive access control system described above must be constructed so that only one write-only token which can be issued by the management-oriented subsystem exists for every block in a storage area in the shared disk, to which each piece of data is allocated. Accordingly, the management-oriented subsystem saves this write-only token in advance in access control data, then fetches the write-only token from the access control data in response to a request from the access-oriented subsystem, and issues it to the requesting access-oriented subsystem. Further, the management-oriented subsystem, each time the access-oriented subsystem writes the data to the shared disk, records the data writing as log data in the shared disk, and updates at a predetermined timing, based on the log data, management data which will hereinafter referred to as "metadata" recorded on the shared disk in order to manage the respective pieces of data as files.

On the other hand, Japanese Patent Application No. 11-143502 is descriptive of an exclusive access control system capable of making it unnecessary for each access-oriented subsystem to inquire the management-oriented subsystem about a data writing target block on the shared disk by previously transferring a management of a part of the storage area in the shared disk from the management-oriented subsystem to the access-oriented subsystem, in order to enhance an execution performance of the distributed processing system as a whole. According to the exclusive access control system described in the above Patent Application, with respect to a storage area (which will hereinafter termed a "reserve area") of which management is transferred from the management-oriented subsystem, each access-oriented subsystem obtains more of the write-only tokens from the management-oriented subsystem and may save these tokens in its own access control data. Then, each access-oriented subsystem, based on the write-only tokens in its own access control data, allocates the blocks in the reserve area managed by itself to the data requested to be written into the shared disk by the application. Hence, there is no necessity for the access-oriented subsystem to inquire accessibility of data from the management-oriented subsystem each time data is updated.

The metadata about the blocks in the reserve area which have thus been allocated to data by the access-oriented subsystem are updated within this access-oriented subsystem, and the management-oriented subsystem is notified of the updated metadata at a proper timing. The management-oriented subsystem having received this notification updates the metadata held by itself for managing the whole shared disk on the basis of the notified metadata, and records this updated content in the log data within the shared disk. Note that the management-oriented subsystem issues the read-only token with respect to the storage area of which management has been transferred to any one of access-oriented subsystem, in response to a data reading request given from other access-oriented subsystem.

In the distributed processing system adopting the exclusive access control method described above, if the management-oriented subsystem falls into a process-down or if the computer falls into a node-down, the access-oriented subsystem becomes incapable of continuing the process, and hence it follows that the whole distributed processing system comes to a system-down with abnormal halt of a higher-order subsystem or application program that requests the access-oriented subsystem for the data access.

The system-down of the whole distributed processing system must be avoided, if it is such a system that data are always accessed from over the world, e.g., Internet service providers.

In the conventional distributed processing system, however, if the management-oriented subsystem fell into the process-down, the system could not be immediately restored. This is because if the management-oriented subsystem falls into the process-down, the access control data to be retained by this management-oriented subsystem are lost. Therefore, the management-oriented subsystem can not know which access-oriented subsystem is writing the data to the shared disk, so that it cannot make any access-oriented subsystems resume the data writing.

SUMMARY OF THE INVENTION

It is a primary object of the present invention to obviate the problems described above and to provide a data access management system in a distributed processing system capable of making, even if a management-oriented subsystem falls down, a new management-oriented subsystem can know access control data which had been given by the original management-oriented subsystem suffering from the falling-down to each access-oriented subsystem, and therefore of immediately restoring the system as a whole.

To accomplish the above object, according to the present invention, there is provided a data access management system in a distributed processing system comprising a plurality of computers connected to each other under a network environment, and a shared disk. Each of the computers has an access control subsystem for executing a data access to a data storage area in the shared disk based on an access control information indicating an authority of the data access and for retaining the access control information. Any one of the computers has a management subsystem for issuing the access control information to each of the access control subsystems, and for recording the access control information. Further, at least any one of the computers has a standby management subsystem for requesting, if the management subsystem is incapable of continuing the process, each of the access control subsystems of the access control information retained by each of the access control subsystems, and recording the access control information of which the access control subsystem notifies in response to the request to function as a new management-oriented subsystem.

With this architecture, if the management subsystem falls down and is incapable of continuing its operation, access control information recorded on this management subsystem are lost. Instead, the standby management subsystem starts functioning as a new management subsystem, then, the access control subsystem is requested to notify the standby management subsystem of the access control information saved by the access control subsystem itself, which is recorded by the standby management subsystem. Accordingly, the new management subsystem is capable of continuing the process conducted by the original management subsystem before the original management subsystem fell down, by use of the access control information.

BRIEF DESCRIPTION OF THE DRAWINGS

These objects and advantages of this invention will become more apparent and more readily appreciated from the following detailed description of the presently preferred embodiments, taken in conjunction with the accompanying drawings of which.

DESCRIPTION OF THE PREFERRED EMBODIMENT

An embodiment of the present invention will hereinafter be described with reference to the accompanying drawings.

<Outline of Architecture of Distributed Processing System>

Figure 1:
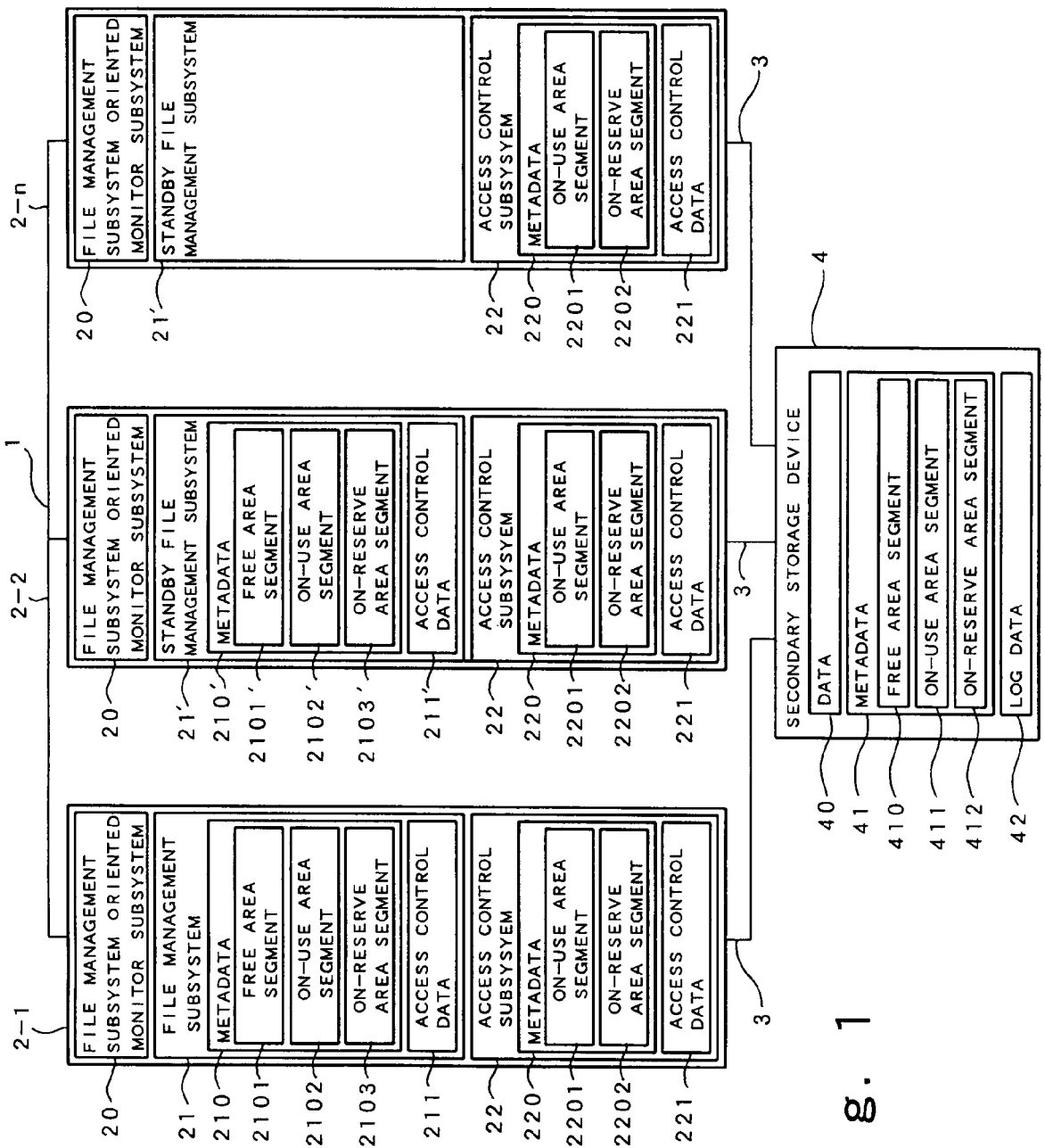
FIG. 1 is a block diagram showing a software architecture as a whole of a distributed processing system in an embodiment of the present invention.
Figure 2:
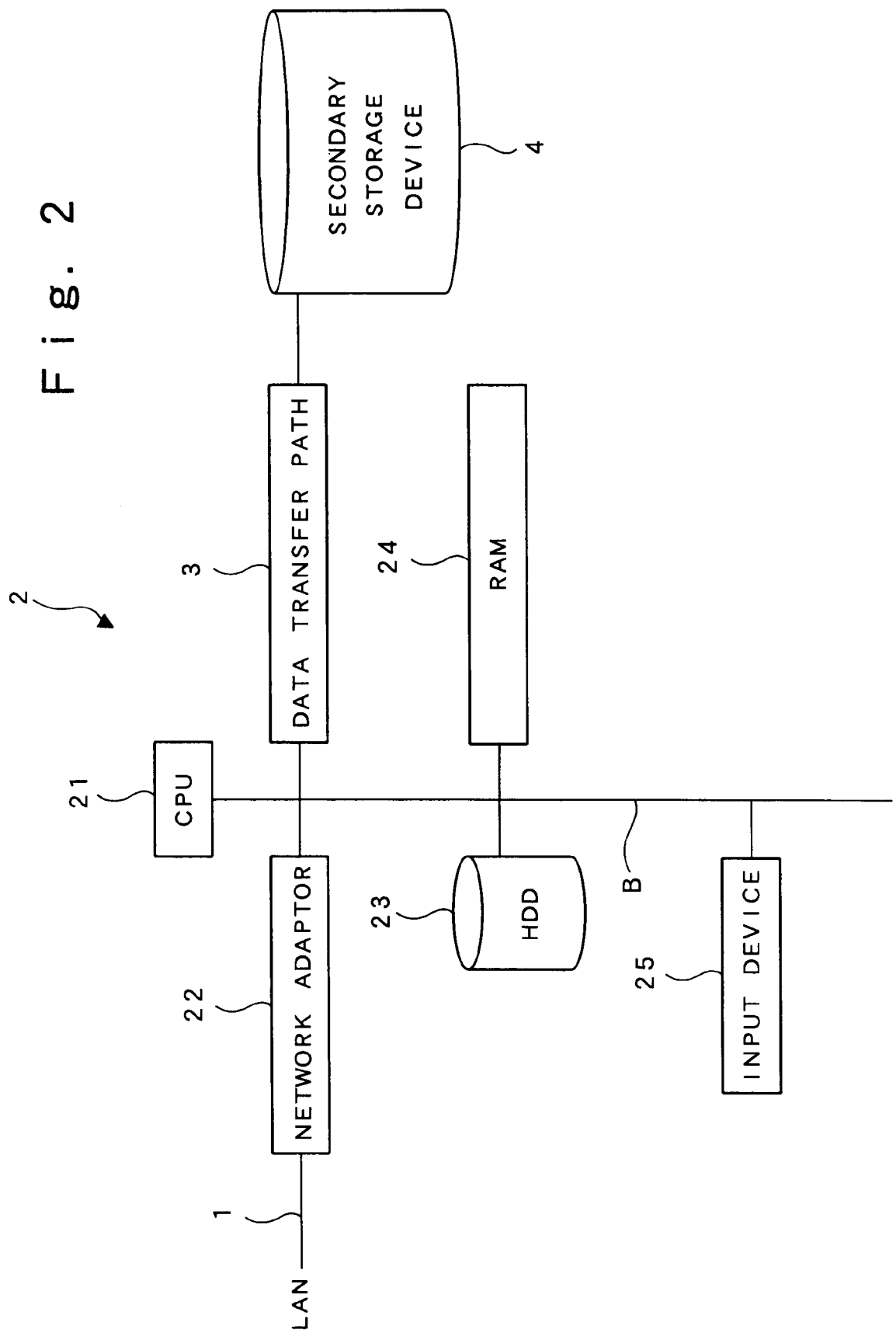
FIG. 2 is a block diagram showing an internal configuration of a computer in FIG. 1.

FIG. 1 is a block diagram showing a software architecture of a distributed processing system in this embodiment. FIG. 2 is a block diagram showing a hardware architecture of one of the computers and a secondary storage device shown in FIG. 1.

As shown in FIG. 1, this distributed processing system is constructed of a plurality (n-pieces) of computers (generally called "nodes") 2-1~2-n connected to each other via a local area network (LAN) 1, and a secondary storage device 4 connected to each of the computers 2 via data transfer paths 3 such as SAN (Storage Area Network).

<Software Architecture of Distributed Processing System>

This secondary storage device 4 has a built-in shared disk configuring a shared file system, and is accessed directly from each node 2 via the data transfer path 3. A storage area in this secondary storage device 4 contains metadata 41 and log data 42, and a remaining storage area is a data area 40 for storing data to be shared.

This data area 40 is composed of a multiplicity of blocks each given a unique address (logical address).

The metadata 41 may be defined as an area in which data for managing the respective blocks within the data area 40 are retained. Information within this metadata 41 are segmented into a free area segment 410, an on-use area segment 411, and an on-reserve area segment 412, thus forming a B-tree structure or a list structure. The information contained in the free area segment 410 are those for managing head addresses of the blocks which are not allocated to the data in the data area 40. Further, the information contained in the on-use area segment 411 are those for managing the data, as a file, to which the block is allocated in the data area 40, and retain, with respect to each piece of data, a path name of that piece of data, a head address of the block stored with that piece of data, a size of the block stored with the same data, a creation time and a final update time of the same data, and a creator and a final reference person of that piece of data. Further, the information contained in the on-reserve area segment 412 are a head address of the block of which a management is transferred as an on-reserve area to the access control subsystem (access-oriented subsystem) 22 of any one of the computers 2-1~2-n by a file management subsystem (management-oriented subsystem) 21 which will be explained later on, and identification of an access control subsystem 22 managing that block.

Note that the metadata 41 should be essentially updated each time the data in the data area 40 is accessed (newly written, read out, updated and deleted). The metadata 41 are, however, composed of an enormous number of information. Hence, if a piece of data is retrieved from the metadata 41 and then updated each time corresponding data is accessed, a speed of data accessing may be decreased. Therefore, when an operation (data accessing) that triggers updating the metadata 41 occurs, a content of this operation is temporarily stored in the log data 42 by the file management system 21, and, based on the fact that the content of the operation has completely been stored in the log data 42, the file management system 21 judges that the operation succeeds.

On the other hand, each of the computers 2-1~2-n takes the hardware architecture as illustrated in FIG. 2. To be specific, each of the computers 2-1~2-n is mainly constructed of a CPU 21, a network adapter 22, a hard disk 23, a RAM 24 and an input device 25, which are connected to each other via a bus B.

The network adapter 22 assembles the data received from the CPU 21 and addressed to other computers into packets and transmits the packets to the LAN 1. The network adapter 22 also deassembles the packets flowing on the LAN into a data format in which the CPU 21 can process the data, and notifies the CPU 21 of those pieces of data.

The input device 25 may be a keyboard and a pointing device through which the operator inputs a variety of commands etc.

The CPU 21, a central processing unit for executing the control of the computers 2 as a whole, reads a variety of programs stored in the hard disk 23 onto the RAM 24, and sequentially executes the programs.

The RAM 24 is a main storage device on which the operation area for the CPU 21 is developed. The programs read onto the RAM 24 and executed by the CPU 21, are an operating system and a variety of application programs. This OS is UNIX and functions as a client OS and a server OS as well in connection with other computers 2. Namely, the distributed processing system in this embodiment is configured based on a UNIX-based server/client system in which a server and clients are so connected via the LAN 1 as to communicate with each other.

This OS contains, as shown in FIG. 1, the access control subsystem 22 undertaking the data access to the secondary storage device 4 on the basis of a data access request given from a variety of application programs. Further, the OS on one specified computer 2 contains the file management subsystem 21 which actualizes exclusive access control by batchwise managing the data accesses to the secondary storage device 4. For the management, the access control subsystems 22 issues, in response to a request from each of the access control subsystems 22, a token for writing data and a token for reading data to each of the access control subsystems 22, and transferring the management of the data area 40 in the secondary storage device 4 to each of these access control subsystems 22. The data transmission is actualized by transferring an information of data structure which expresses a procedure corresponding to a category of a file operation through a socket between the file management subsystem 21 and each of the access control subsystems 22. The process of transmitting the information is phrased as issuing of "procedure". This "procedure" contains a transmission identifier that is unique among the procedures issued by some computer, a procedure number representing a category of the procedure, and essential data corresponding to the procedure number.

Functions of each of the access control subsystems 22 and of the file management subsystem 21 will hereinafter be explained.

The file management subsystem 21 reads a part or the whole of the metadata 41 from the secondary storage device 4 as the necessity may arise, and copy these pieces of data as metadata 210 to a location inside the subsystem 21 itself. Accordingly, the metadata 210 within the file management subsystem 21 contain a free area segment 2101 (corresponding to a part or the whole of the free area segment 410) relative to a part or the whole of the data area 40 on the secondary storage device 4, and an on-use area segment 2102 (corresponding to a part or the whole of the on-use area segment 411). On the other hand, the on-reserve area segment 412 is, as will be described later on, generated by the file management subsystem 21 itself, and hence the file management subsystem 21 never reads the metadata 41 on the secondary storage device 4.

The file management subsystem 21 also generates a write-only token indicating an authority of the data writing for every per block in the data area 40 on the secondary storage device 4 which is managed by the file management subsystem 21 itself on the basis of the free area segment 2101 and the on-use area segment 2102 within the metadata 210, and stores the write-only tokens in the access control data 211. Note that, as the write-only tokens with respect to each data file stored in the data area 40 on the secondary storage device 4, there exist a data write-only token indicating an authority of updating the content of the data file itself, a size write-only token indicating an authority of updating size information contained in the on-use area segment 2102 of the metadata 210, an attribute write-only token indicating an authority of updating an attribute, a path name write-only token indicating an authority of updating a path name, a time write-only token indicating an authority of updating a final update time, and so on. The access control data 211 stores, when issuing a write-only token to an access control subsystem 22, identification of the access control subsystem 22 to which the token has been issued.

Moreover, the file management subsystem 21, whenever requested by each of the access control subsystems 22 to read the data file in the data area 40 on the secondary storage device 4, generates the read-only token indicating the authority of reading the data as far as any write-only token with respect to that data file is not yet issued, and issues this generated token to the requesting access control subsystem 22. There exist, as the read-only tokens, a data read-only token indicating an authority of reading the content of the data file itself, a size read-only token indicating an authority of reading size information contained in the on-use area segment 2102 of the metadata 210, an attribute read-only token indicating an authority of reading an attribute, a path name read-only token indicating an authority of reading a path name, a time read-only token indicating an authority of reading a final update time, and so forth. When any read-only token is issued to an access control subsystem 22, the access control data 211 are stored with identification of the access control subsystem 22 to which the token has been issued.

The access control subsystem 22 having received any token does not immediately open a data file which is an object of the token but become capable of arbitrarily opening the data file. Then, each access control subsystem 22, when opening and closing the data file corresponding to the token held by the subsystem 22 itself, notifies the file management subsystem 21 of a path name of that data file. The file management subsystem 21, based on the notification given from the access control subsystem 22, stores the access control data 211 with the path name of the data file that is now open, together with the identification of the computer 2 on which the access control subsystem 22 opening that data file is being executed as file open information.

The access control subsystem 22, according to the necessity, requests the file management subsystem 21 to transfer the management of the free area in the data area 40 on the secondary storage device 4. Then, the file management subsystem 21 extracts information about blocks for a predetermined storage capacity which are contained in the free area segment 2101 of the metadata 210 from the free area segment 2101, and incorporates the information about the block data into the on-reserve area segment 2103 with being attached with the identification of the requesting access control subsystem 22, and at the same time notifies the requesting access control subsystem 22 of the information about the same block data. Further, the file management subsystem 21 records a content of that operation in the log data 42 on the secondary storage device 4. The requesting access control subsystem 22, based on the information received from the file management subsystem 21, generates an on-reserve area segment 2202 within metadata 220 possessed by the subsystem 22 itself.

Further, the access control subsystem 22 is, with respect to the blocks in the data area 40 on the secondary storage device 4 which are managed in the self-metadata 220, capable of demanding the data write-only token from the file management subsystem 21. The file management subsystem 21 having received this request issues, to the request originating access control subsystem 22, en bloc the data write-only tokens pertaining to a group of blocks within the reserve area, of which the management has been transferred to the request originating access control subsystem 22. The requesting access control subsystem 22 stores in its own access control data 221 the data write-only tokens that have thus been issued en bloc.

The access control subsystem 22, when receiving a data write request from the application, allocates a block in the data area 40 on the secondary storage device 4 that is specified by the information contained in the on-reserve area 2202 of the self-metadata 220 to the data which is a object of the data write request, on condition that the data write-only token corresponding to the block is held in the access control data 221. The information about the thus allocated block is extracted from the on-reserve area segment 2202 and incorporated into the on-use area segment 2201 within the metadata 220. Thus, the access control subsystem 22 is capable of writing data into an area of which the management has been transferred to the subsystem 22 itself, independently of the file management subsystem 21. Hence, with respect to this area, the contents of the metadata 220 of the access control subsystem 22 are correctly matched with the contents of the data area 40 on the secondary storage device 4 but are not necessarily matched with the contents of the on-use area segment 2102 and of the on-reserve area segment 2103 in the metadata 210 of the file management subsystem 21. Therefore, the access control subsystem 22 notifies batchwise the file management subsystem 21 of the contents of its own metadata 220 at a proper timing. The file management subsystem 21 having received this notification mirrors the contents of the metadata notified in the on-use area segment 2102 and the on-reserve area segment 2103 of the self-metadata 210, thereby matching the contents of the metadata 210 with the contents of the data area 40 on the secondary storage device 4. Further, the file management subsystem 21 records a content of the operation for this matching process in the log data 42 on the secondary storage device 4.

Note that the access control subsystem 22 is the data file capable of requesting the file management subsystem 21 to read any data file stored in any one of the blocks in the data area 40 on the secondary storage device 4 responding to the data read request from the application. The access control subsystem 22 reads the data file requested to be read by the application on the basis of the read-only token issued in response to this request by the file management subsystem 21.

The process for the thus functioning file management subsystem 21 is executed only on a single computer 2 among the plurality of computers 2 configuring the distributed processing system. A standby file management subsystem (standby management-oriented subsystem) 21' having absolutely the same function as the process for the file management subsystem 21 is also executed on each of other computers 2-2~2-n so that the control executed by the file management subsystem 21 can be immediately taken over by any one of standby file management subsystem 21', in case this process for the file management subsystem 21 falls into a process-down, and in case the computer 2-1 where the process for the file management subsystem 21 had been executed falls into a node-down. Accordingly, this standby file management subsystem 21', as in the case of the file management subsystem 21, has metadata 210' segmented into a free area segment 2101', an on-standby area segment 2102' and an on-reserve area segment 2103', and also access control data 211'.

For the duration of the control actually performed by the file management subsystem 21, however, the respective standby file management subsystems 21' perform neither the communications with the individual access control subsystems 22 nor the access to the secondary storage device 4. Accordingly, in the meantime, the metadata 210' (the free area segment 2101', the on-use area segment 2102' and the on-reserve area segment 2103') and the access control data 211' that are possessed by each of the standby file management subsystems 21' remain blank.

Further, monitor subsystems for the file management subsystems (file management subsystem oriented monitor subsystem) 20 function on all the computers 2-1~2-n configuring the distributed processing system. Each file management subsystem oriented monitor subsystem 20 monitors whether or not the file management subsystem 21 or the standby file management subsystem 21' executed on the same computer 2 to which the subsystem 20 itself belongs falls into the process-down. More specifically, each file management subsystem oriented monitor subsystem 20 configures a communication path through a socket to the file management subsystem 21 or the standby file management subsystem 21' executed on the same computer 2 to which the subsystem 20 itself belongs, and, if this communication path is disconnected, judges that the process-down occurs. When detecting that the file management subsystem 21 or the standby file management subsystem 21' has fallen into the process-down, the file management subsystem oriented monitor subsystem 20 notifies the file management subsystem oriented monitor subsystems 20 on other computers 2 of the fact via the LAN 1. To be more specific, this notification is made by use of an event notifying function of a cluster base function operating on the plurality of computers 2, a database function of the cluster base function operating on the plurality of computers 2, or a communication mechanism such as a socket between the file management subsystem oriented monitor subsystems 20 on the respective computers 2.

Further, the file management subsystem oriented monitor subsystem 20 on each computer 2 checks which computer 2 has fallen into the node-down. Specifically, this monitoring is attained by use of a node monitoring function of the cluster base function operating on the plurality of computers 2, or a communication function based on a hardware-to-hardware mutual monitoring mechanism using the LAN 1.

Then, when the file management subsystem oriented monitor subsystem 20 recognizes that the standby file management subsystem 21' executed on the same computer 2-2~2-n on which the subsystem 20 itself is executed has fallen into the process-down, the file management subsystem oriented monitor subsystem 20 reboots the standby file management subsystem 21'.

Further, when the file management subsystem oriented monitor subsystem 20 executed on the same computer 2-2~2-n to which the standby file management subsystem 21' belongs recognizes that the file management subsystem 21 has fallen into the process-down, or that the computer 2-1 on which the file management subsystem 21 is executed has fallen into the node-down, the subsystem 20 determines the standby file management subsystem 21' made to newly function as the file management subsystem 21. Actualization of this determination involves updating the data on the database by use of a constitutional database function of the cluster base function operating on the plurality of computers 2. Upon thus determining the standby file management subsystem 21' thus made to newly function as the file management subsystem 21, each of the file management subsystem oriented monitor subsystems 20 notifies a kernel module for the access control subsystem 22 on each computer 2 of a host name and a port number (or a port name defined in /etc/service file) of the new file management subsystem 20 through a system call.

Note that if the file management subsystem 21 falls into the process-down, the file management subsystem oriented monitor subsystem 20 executed on the same computer 2 on which this file management subsystem 21 is executed reboots the process for the file management subsystem 21 as the standby file management subsystem 21' on that computer 2, and executes a process for updating contents of the constitutional database of the cluster base function. Accordingly, if the file management subsystem 21 is incapable of continuing the process, and even when the standby file management subsystems 21' do not exist on other computers 2, the standby file management subsystem 21' booted on the same computer 2 comes to function as a new file management subsystem 21.

<Processes in Distributed Processing System>

Processes executed by the file management subsystem 21, each of the file management subsystem oriented monitor subsystems 20, each of the standby file management subsystems 21' and each of the access control subsystems 22 on the occasion of the process-down of the file management subsystem 21 will be explained in detail with reference to flowcharts in FIGS. 3 through 9.

(File Management Subsystem)

Figure 3:
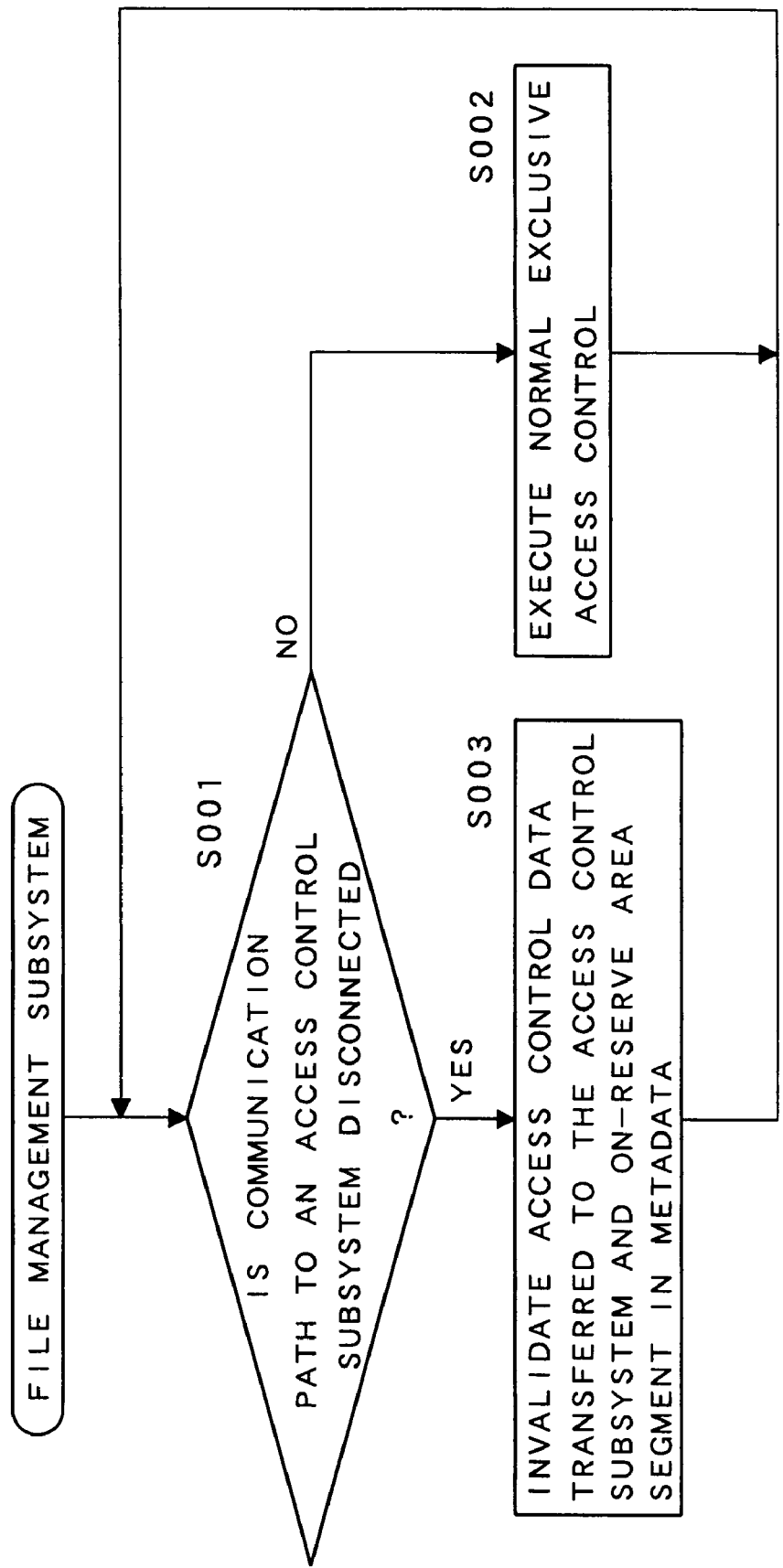
FIG. 3 is a flowchart showing a content of processing by a file management subsystem.

The file management subsystem 21, as shown in FIG. 3, at first step S001 after a start, checks whether the communication path to each access control subsystem 22 is disconnected or not on the basis of whether or not a terminal point of a socket to the kernel module for the access control subsystem 22 is cut off. Then, if none of the communication paths to any access control subsystems 22 is disconnected, the file management subsystem 21 executes a process for the normal exclusive access control described above, in S002. Subsequently, after executing a substantial part of the process for the exclusive access control, the file management subsystem 21 returns to S001.

On the other hand, if it is judged in S001 that a communication path to any one of the access control subsystems 22 is disconnected, the file management subsystem 21 judges that the kernel module for the access control subsystem 22 existing ahead of the disconnected communication path is incapable of continuing the process. Then, in S003, the file management subsystem 21 discards the information (i.e., the information about the write-only token issued to the access control subsystem 22, and the file open information) retained in its own access control data 211 with respect to the access control subsystem 22. The token can be thereby issued to other access control subsystems 22 with respect to the data file that had been the object of the write-only token. Further, in S003, the file management subsystem 21 extracts the information contained in the on-reserve area segment 2103 with respect to the access control subsystem 22 existing ahead of the disconnected communication path, and incorporates the same information into the free area segment 2101. This makes it feasible to transfer the management of the storage area block in the data area 40 on the secondary storage device 4 which the access control subsystem 22 had managed to other access control subsystem 22. Incidentally, even in this case, the data file in that block in the data area 40 remains, however, after the file management subsystem 21 transfers the management of that block to other access control subsystem 22, the data file in that block will be overwritten with a different data file by the access control subsystem 22 to which the management has been newly transferred. The file management subsystem 21, when completing the process in S003, returns the processing to S001.

Note that, if the kernel module for the access control subsystem 22 does not transmit the normal procedure for a fixed period of time, the file management subsystem 21 may transmits a dummy procedure, and thereafter, if a response to this dummy procedure is not transmitted for a fixed period of time or longer, the file management subsystem 21 may judges that the kernel module for the access control subsystem 22 is incapable of continuing the process, in S001.

(File Management Subsystem Oriented Monitor Subsystem)

Figure 4:
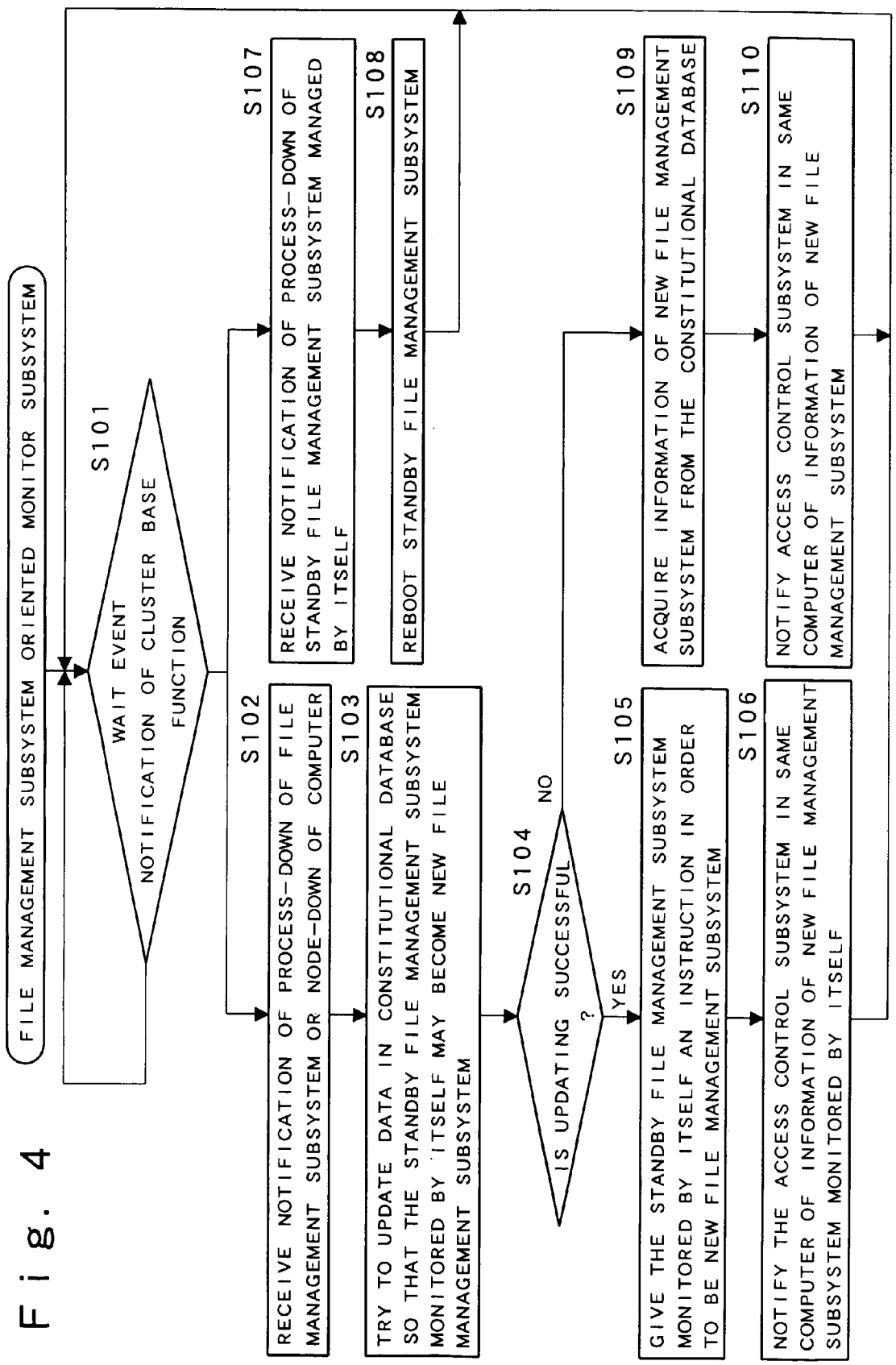
FIG. 4 is a flowchart showing a content of processing by a monitor subsystem for a file management subsystem.

The file management subsystem oriented monitor subsystem 20, as shown in FIG. 4, waits a notification of an event of the cluster base function in first step S101 after the start.

Then, if notified of the process-down of the file management subsystem 21 or the node-down of the computer, the file management subsystem oriented monitor subsystem 20 receives this notification in S102.

In next step S103, the file management subsystem oriented monitor subsystem 20 tries to update data in the constitutional database provided by the cluster base function so that the standby file management subsystem 21' monitored by the subsystem 20 itself becomes a new file management subsystem. Then, if succeeding in updating the constitutional database so that the standby file management subsystem 21' monitored by the subsystem 20 itself becomes the new file management subsystem, the file management subsystem oriented monitor subsystem 20 gives, via the socket communication, the standby file management subsystem 21' monitored by the subsystem 20 itself an instruction in order to be new file management subsystem 21m, in S105.

In next step S106, the file management subsystem oriented monitor subsystem 20 notifies, through the system call, access control subsystem 22 executed on the same computer 2 to which the subsystem 20 itself belongs of the information (i.e., the host name and the port number or the port name defined in /etc/service file) of the new file management subsystem 21 monitored by the subsystem 20 itself.

Whereas if judging in S104 that the constitutional database could not be updated so that the standby file management subsystem 21' monitored by the subsystem 20 itself becomes the new file management subsystem 21, the standby file management subsystem 21' on other computer 2 becomes the new file management subsystem 21, and hence the file management subsystem oriented monitor subsystem 20 acquires in S109 the information (i.e., the host name and the port number or the port name defined in /etc/service file) of the new file management subsystem 21 from the constitutional database provided by the cluster base function.

In next step S110, the file management subsystem oriented monitor subsystem 20 notifies, through the system call, access control subsystem 22 executed on the same computer 2 to which the subsystem 20 itself belongs of the information (i.e., the host name and the port number or the port name, defined in /etc/service file) of the new file management subsystem 21 acquired in S109.

Upon completions of S106 and S110, the file management subsystem oriented monitor subsystem 20 returns the processing to S101.

On the other hand, when notified of the process-down of the standby file management subsystem 21' managed by the subsystem 20 itself, the file management subsystem oriented monitor subsystem 20 receives this notification in S107.

In next step S108, the file management subsystem oriented monitor subsystem 20 reboots the standby file management subsystem 21'. With a completion of S108, the file management subsystem oriented monitor subsystem 20 returns the processing to S101.

(Standby File Management Subsystem)

Figure 5:
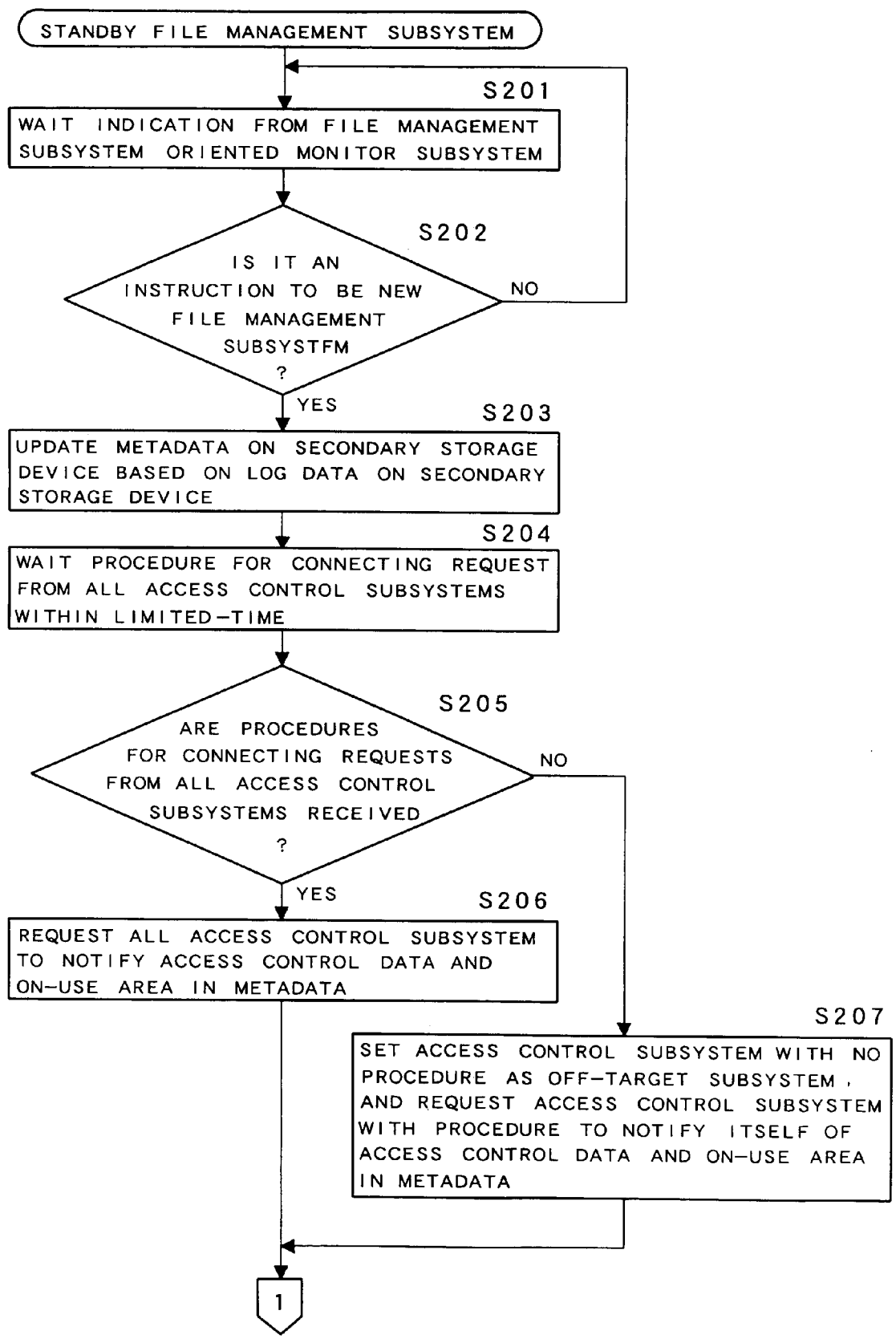
FIG. 5 is a flowchart showing a content of processing by a standby file management subsystem.
Figure 6:
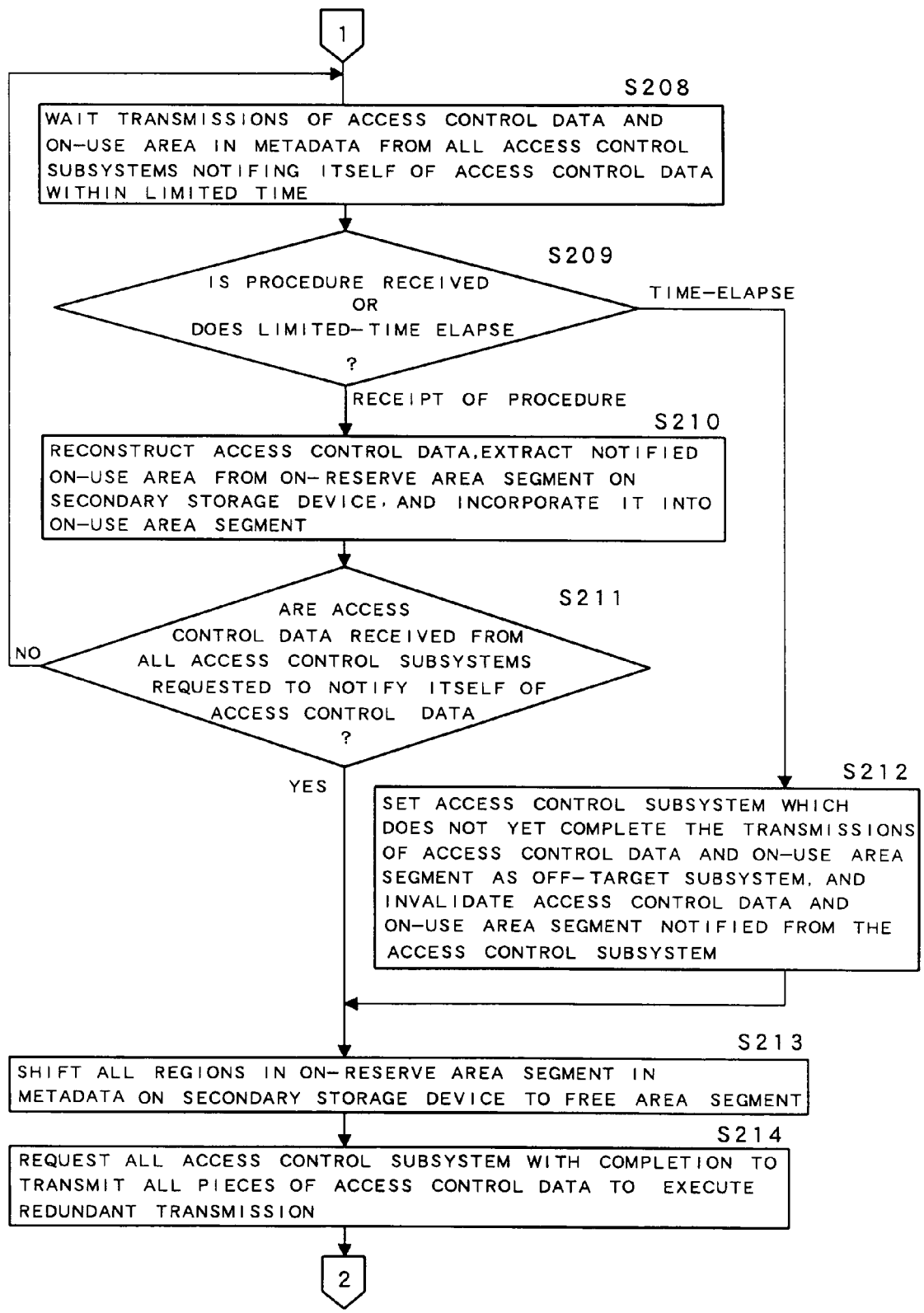
FIG. 6 is a flowchart showing a content of processing by the standby file management subsystem.
Figure 7:
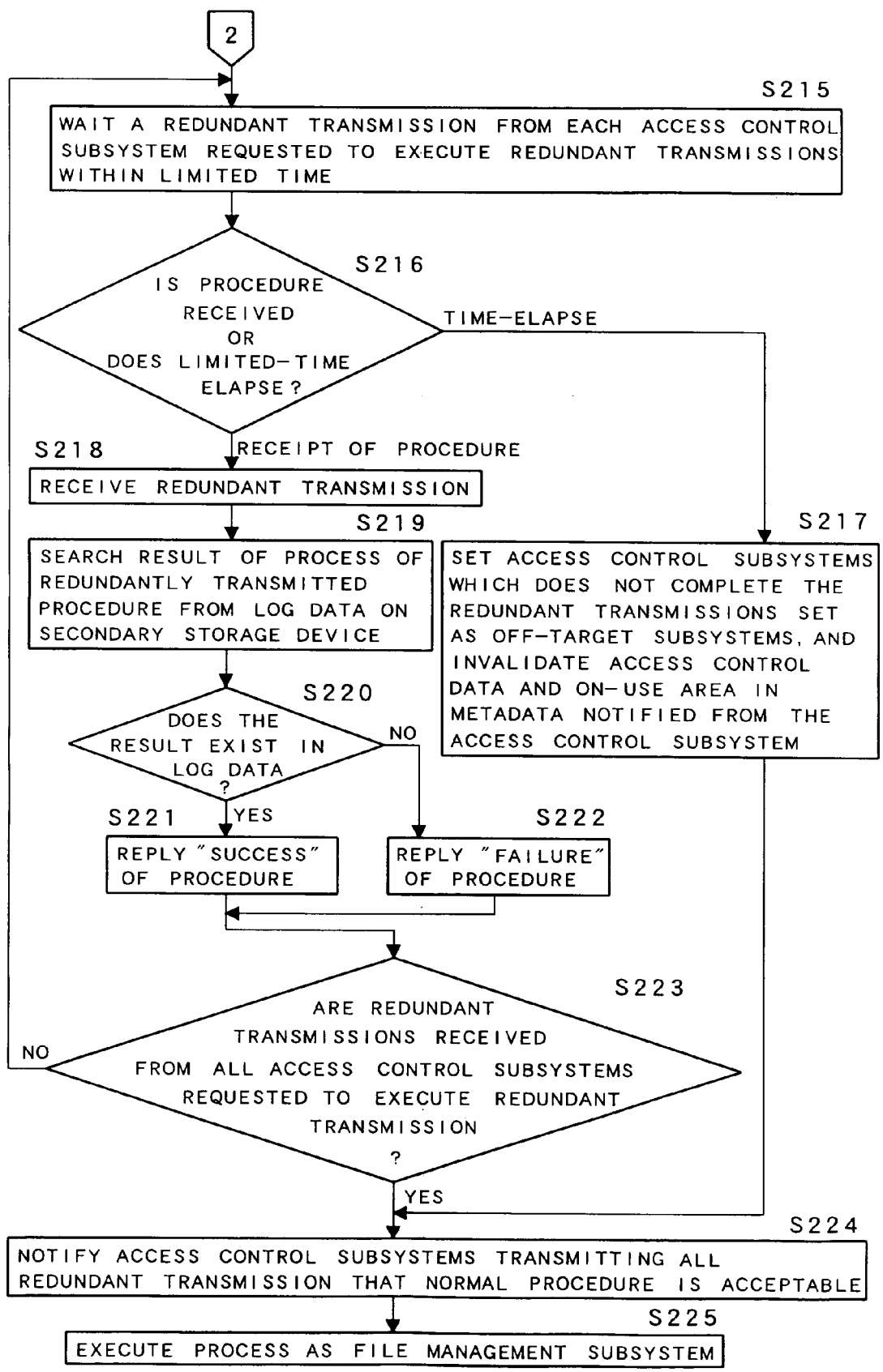
FIG. 7 is a flowchart showing a content of processing by the standby file management subsystem.
Figure 8:
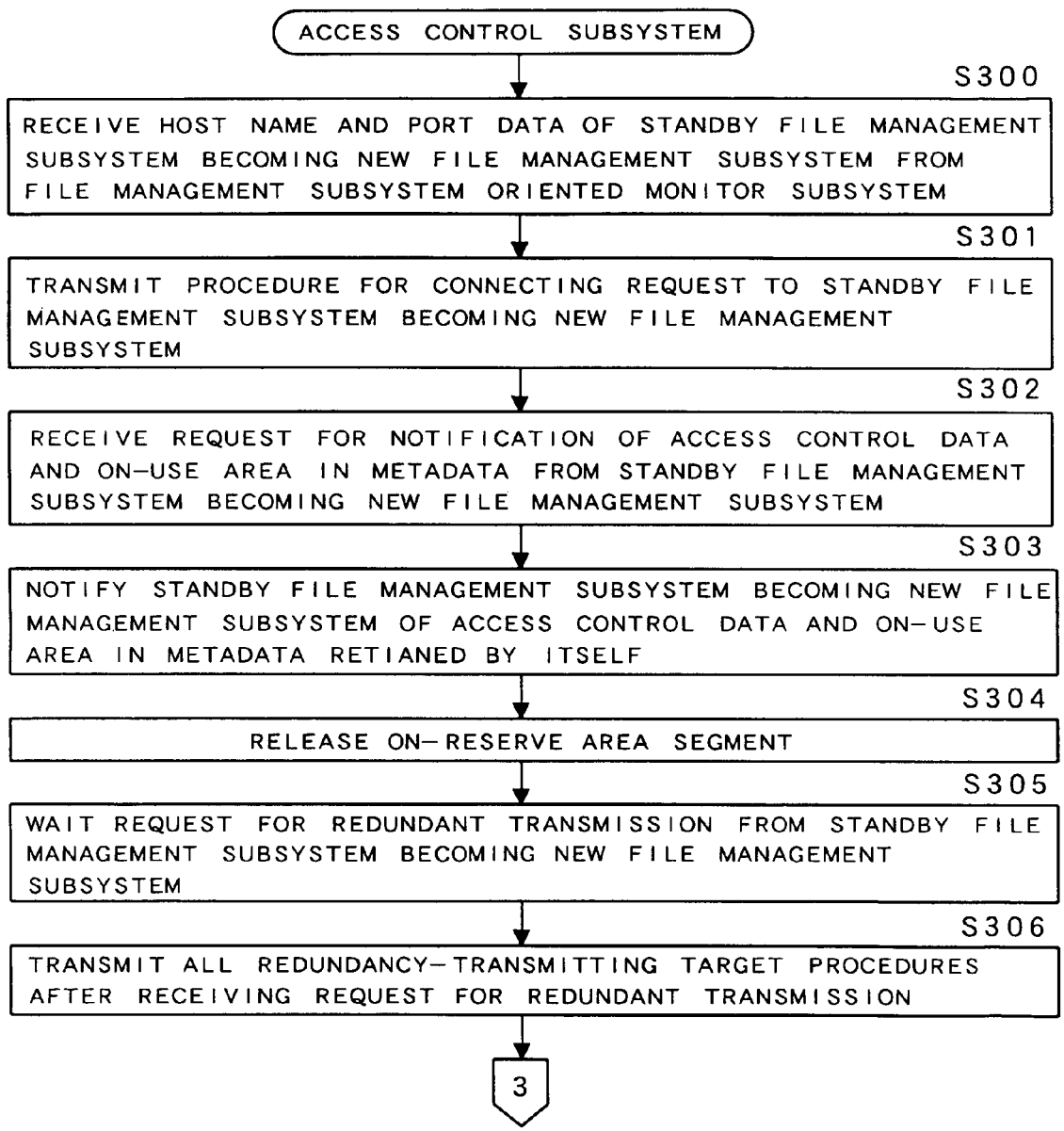
FIG. 8 is a flowchart showing a content of processing by an access control subsystem.
Figure 9:
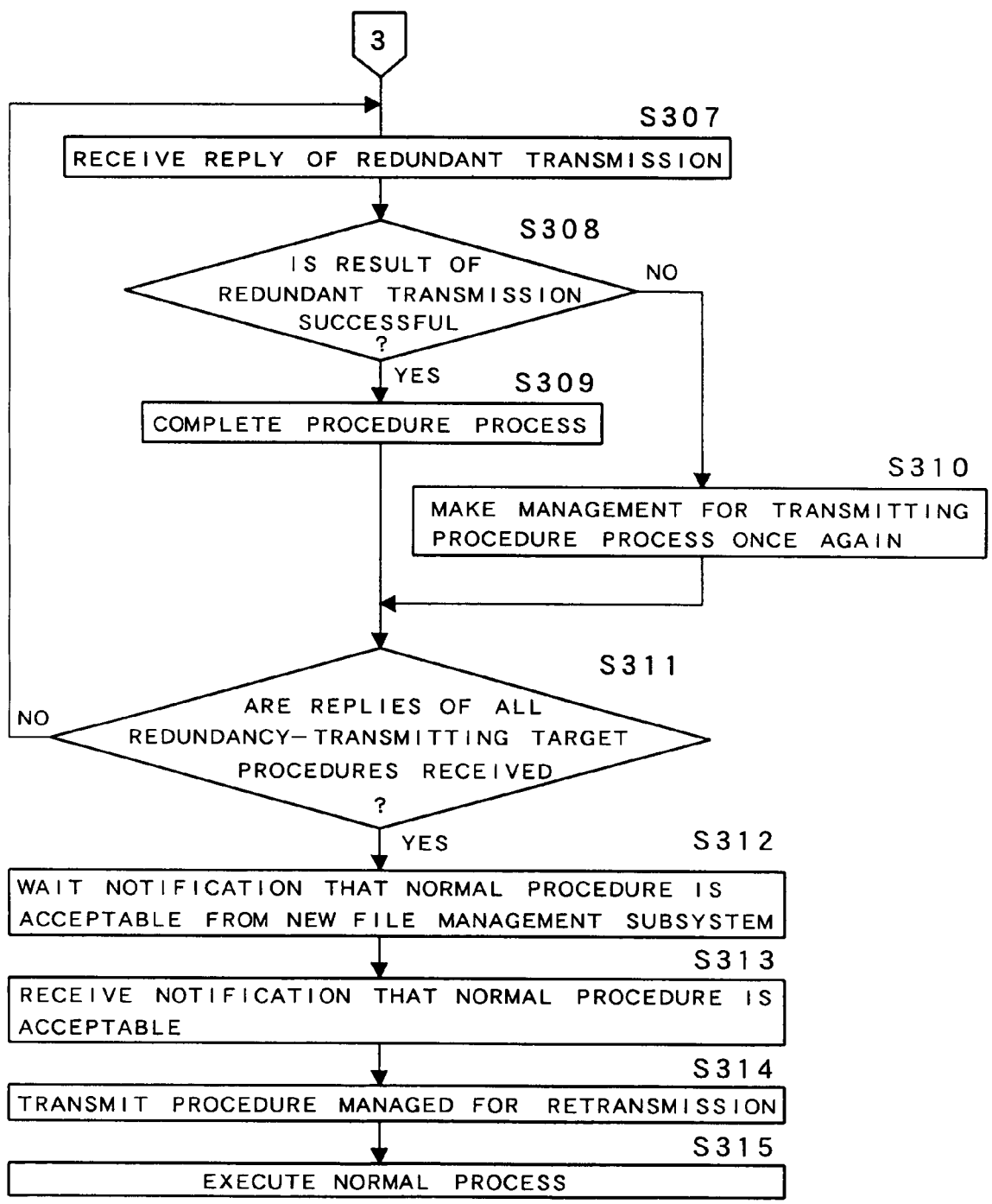
FIG. 9 is a flowchart showing a content of processing by the access control subsystem.

Each standby file management subsystem 21', as shown in FIG. 5, in first step S201 after the start, waits an instruction from the file management subsystem oriented monitor subsystem 20. When given the instruction, in next step S202, the standby file management subsystem 21' checks whether or not this instruction is to be a new file management subsystem issued by the file management subsystem oriented monitor subsystem 20 (see S105). Then, when judging that it is such a instruction, the standby file management subsystem 21' updates in S203 the metadata 41 on the secondary storage device 4 so as to indicate the latest state of the data area 40 on the basis of the log data 42 remaining on the secondary storage device 4.

In next step S204, the standby file management subsystem 21' starts counting a limited-time, and waits a procedure for a connecting request from each access control subsystem 22.

Then, if the limited-time has elapsed, the standby file management subsystem 21' checks in next step S205 whether or not the procedures for the connecting requests from all the access control subsystems 22 are received. Then, when receiving the procedures for the connecting requests from all the access control subsystems 22, the standby file management subsystem 21' gives in S206 all the access control subsystems 22 a procedure for requesting a notification of the on-use area segment 2201 of each set of metadata 220 and the access control data 221. On the other hand, if unable to receive the procedure for the connecting request from any one of the access control subsystems 22 (such as a case where a terminal point to a kernel module for an access control subsystem which is opened by a socket is cut off), the standby file management subsystem 21' treats the access control subsystem 22 from which any procedure for the connecting request could not be received as an off-target subsystem, and notifies only the access control subsystems 22 from which the procedures for the connecting requests could be received, of the procedure for requesting the notification of the on-use area segment 2201 of the metadata 220 and the access control data 221, in S207. Upon completions of S206 or S207, the standby file management subsystem 21' proceeds the processing to S208.

In S208, the standby file management subsystem 21' starts counting the limited-time, and waits a notification of the procedures of the on-use area segment 2201 and the access control data 221 from each access control subsystem 22 from each access control subsystem 22 which is notified of the procedure in S206 or S207. In next S209, the standby file management subsystem 21' proceeds the processing to S210 in case the procedure is received from any one of the access control subsystems 22, or advances the processing to S212 in case the limited-time elapses.

In S210, the standby file management subsystem 21' updates the metadata 41 on the secondary storage device 4 based on the received on-use area segment 2201, and updates the access control data 211' of the subsystem 21' itself in accordance with the access data 211. To be specific, the standby file management subsystem 21' incorporates the information about the respective blocks contained in the received on-use area segment 2201 into the on-use area segments 411, 2102' of the metadata 41, 210 on the secondary storage device 4 and in the subsystem 21 itself, and extracts the information about same blocks out of the on-reserve area segments 412, 2103'. Further, based on the received access control data (i.e., the token and the file open information), the standby file management subsystem 21' writes a record that received write-only token has been issued to the transmitting access control subsystem 22 and a content of the file open information to its own access control data 211'.

In next S211, the standby file management subsystem 21' checks whether or not the on-use area segment 2201 and the access control data 221 are received from all the access control subsystems 22 which are notified of the procedure in S206 or S207. Then, if the on-use area segment 2201 and the access control data 221 are note yet received from all those access control subsystems 22, the standby file management subsystem 21' returns the processing to S208. When S208 is executed from the second time onward, however, the restart of counting the limited-time is not done. On the other hand, in the case of receiving the on-use area segment 2201 and the access control data 221 from all these access control subsystems 22, the standby file management subsystem 21' advances the processing to S213.

While on the other hand, when judging in S209 that the limited-time has elapsed, the standby file management subsystem 21' proceeds the processing to S212. In S212, the standby file management subsystem 21' treats the access control subsystems 22 which do not yet complete the transmission of the on-use area segments 2202 and the access control data 221 as off-processing-targets, and invalidates the access control data 221 which is given by these access control subsystems 22. With a completion of S212, the standby file management subsystem 21' advances the processing to S213.

In S213, the standby file management subsystem 21' extracts information about all the blocks contained in the on-reserve area segment 412 in the metadata 4 on the secondary storage device 4 out of the on-reserve area segment 412, and incorporates the same data into the free area segment 410.

In next step S214, the standby file management subsystem 21' requests all the access control subsystems 22 which have completed the transmissions of the on-use area segments 2201 and the access control data 221 within the limited-time set in S208 to execute redundant transmissions. This redundant transmission is executed, in case the file management subsystem 21 is incapable of continuing the process during a wait for a reply to a procedure irrespective of the fact that the kernel module for the access control subsystem 22 has once transmitted the procedure to the process for the original file management subsystem 21, implies because it is unknown whether or not the file management subsystem 21 has normally finished the process for that procedure, to retransmit the procedure once transmitted by the access control subsystem 22 to the standby file management subsystem 21'.

In S215, the standby file management subsystem 21' starts counting the limited-time, and waits a redundant transmission from each of the access control subsystems 22 which are requested to execute the redundant transmission in S214. In next step S216, if there is the redundant transmission from any one of the access control subsystems 22, the processing proceeds to S218 and, when the limited-time elapses, diverts to S217.

In S218, the standby file management subsystem 21' receives the procedure redundantly transmitted.

In next S219, the standby file management subsystem 21' searches a result of processing with respect to the redundantly-transmitted procedure from the log data 42 on the secondary storage device 4.

In next S220, the standby file management subsystem 21', checks whether or not a result of the processing with respect to the redundantly-transmitted procedure exists within the log data 42 on the secondary storage device 4, based on a result of the search in S219. Then, if the result of the processing with respect to the redundantly-transmitted procedure exists within the log data 42, the standby file management subsystem 21' transmits a procedure indicating a success back to the access control subsystem 22 which redundantly transmitted the procedure, based on the metadata 41 existing at present on the secondary storage device 4 in S221. Whereas if the result of the processing with respect to the redundantly-transmitted procedure does not exist within the log data 42, the standby file management subsystem 21' transmits a procedure indicating a failure back to the access control subsystem 22 in S222. Upon a completion of S221 or S222, the standby file management subsystem 21' advances the processing to S223.

In S223, the standby file management subsystem 21' checks whether or not the redundant transmissions are received from all the access control subsystems 22 which are requested to execute the redundant transmission. Then, if the redundant transmissions are not yet received from all those access control subsystems 22, the standby file management subsystem 21' returns the processing to S215. When S215 is executed from the second time onward, however, the restart of counting the limited-time is not effected. Whereas if the redundant transmissions are received from all those access control subsystems 22, the standby file management subsystem 21' proceeds the processing to S224.

On the other hand, if judging in S216 that the limited-time has elapsed, the standby file management subsystem 21' advances the processing to S217. In S217, the standby file management subsystem 21' treats the access control subsystems 22 from which the redundant transmissions could not be received as off-processing-targets. Then, the standby file management subsystem 21' invalidates the processes executed in S210 with respect to the access control data 221, of which those access control subsystems 22 have notified, and to the on-use area segment 2201 in the metadata 220. With a completion of S217, the standby file management subsystem 21' proceeds the processing to S224.

In S224, the standby file management subsystem 21' transmits a procedure for notifying that the normal procedure is acceptable, to the kernel modules for all the access control subsystems 22 having carried out the redundant transmissions received in S218 within the limited-time set in S215.

In next S225, the standby file management subsystem 21' starts the process as a new standby file management subsystem 21. Namely, the standby file management subsystem 21' starts executing the process in FIG. 3.

(Access Control Subsystem)

Each of the access control subsystems 22, in first step S300 after the start, receives information (i.e., a post name and a port name or a port name defined in /etc/service) of the standby file management subsystem 21' that newly becomes the file management subsystem 21, from the file management subsystem oriented monitor subsystem 20 (see S106 and S110).

In next step S301, the access control subsystem 22 transmits the procedure for the connecting request to the standby file management subsystem 21' that newly becomes the file management subsystem 21 on the basis the information received in S300 (see S204 and S205).

In next S302, the access control subsystem 22 receives a request for a notification of the access control data 221 and the on-use area segment 2201 in the metadata 220 from the standby file management subsystem 21' that newly becomes the file management subsystem 21 (see S206). Then, when receiving this request, the access control subsystem 22 advances the processing to S303.

In S303, the access control subsystem 22 notifies the subsystem 21' of the access control data 221 (i.e., the token and the file open information) and the on-use area segment 2201 in the metadata 220 (see S208 through S211) retained by the subsystem 22 itself.

In next step S304, the access control subsystem 22 deletes all pieces of information contained in the on-reserve area segment 2202 in the self-metadata 220.

In next S305, the access control subsystem 22 waits a request for the redundant transmission from the standby file management subsystem 21' that newly becomes the file management subsystem 21 (see S214). Subsequently, the access control subsystem 22, when receiving the redundant transmission request, advances the processing to S306.

In S306, the access control subsystem 22 transmits all the procedures which are objects of redundant-transmission to the standby file management subsystem 21' that newly becomes the file management subsystem 21 (see S215~S218).

In next step S307, the access control subsystem 22 receives a reply (S221 or S222) sent by the standby file management subsystem 21' that newly becomes the file management subsystem 21 with respect to the redundant transmissions in S306.

In next step S308, the access control subsystem 22 checks whether the reply about the redundant transmission which has been received in S307 indicates a success or a failure. Then, if the reply about the redundant transmission indicates a success, the access control subsystem 22 considers the procedure process corresponding to that reply to be completed in S309 and advances the processing to S311. Whereas if the reply about the redundant transmission which has been received in S307 indicates a failure, the access control subsystem 22 makes the process for the procedure corresponding to that reply an object of management in order to transmit it once again in S310, and thereafter the processing proceed to S311.

In S311, the access control subsystem 22 checks whether or not there are received the replies of all the procedures which are objects of redundant-transmission and transmitted in S306 to the standby file management subsystem 21' that newly becomes the file management subsystem 21. Then, if the replies of all the procedures are not yet received, the access control subsystem 22 returns the processing to S307. Whereas if the replies of all the redundant-transmission target procedures are received, the access control subsystem 22 advances the processing to S312.

In S312, the access control subsystem 22 waits a notification purporting that the normal procedure is acceptable (see S224), which is to be transmitted by the new file management subsystem 21.

In next step S313, the access control subsystem 22 receives that notification transmitted by the new file management subsystem 21.

In next step S314, the access control subsystem 22 transmits all the processes for the procedure managed for the retransmission since S310 to the new file management subsystem 21.

In next step S315, the access control subsystem 22 starts executing the normal process.

<Operation of Distributed Processing System>

Next, operations of the file management subsystem oriented monitor subsystem 20, the access control subsystem 22 and the standby file management subsystem 21' on each computer 2 in the distributed processing system according to this embodiment having the architecture described above in the case where the original file management subsystem 21 falls into the process-down, will specifically be explained.

When the original file management subsystem 21 falls into the process-down, the file management subsystem oriented monitor subsystem 20 executed on the same computer to which this subsystem 21 belongs, detects that this file management subsystem 21 has fallen into the process-down, based on a disconnection of the communication path through a socket to the file management subsystem 21, and notifies the file management subsystem oriented monitor subsystems 20 on other computers 2 of this fact in use of an event notification of the cluster base function. Further, if the computer 2 on which the original file management subsystem 21 is executed falls into the node-down, another file management subsystem oriented monitor subsystem 20 on another computer 2 which had mutually communicated with the file management subsystem oriented monitor subsystem 20 on this computer 2 via the cluster function base, detects the node-down of the computer 2 on which the original file management subsystem 21 is executed.

Thus, the file management subsystem oriented monitor subsystem 20 on each computer 20, which has recognized the process-down of the original file management subsystem 21 or the node-down of the computer 2 on which the same file management subsystem 21 is executed, tries to update the constitutional database provided by the cluster base function so that the standby file management subsystem 21' executed on the same computer 2 on which the subsystem 20 itself is executed may function as a new file management subsystem 21 (S103).

Then, if the constitutional database is successfully updated, it follows that the standby file management subsystem 21' executed on the same computer 2 is determined to be the new file management subsystem 21, and hence the file management subsystem oriented monitor subsystem 20 gives this standby file management subsystem 21' an indication for making it function as the new file management subsystem 21 (S105). At the same time, the monitor subsystem 20 notifies the access control subsystem 22 executed on the same computer of the information (i.e., the host name and the port number or the port name) of the standby file management subsystem 21' (S106).

Whereas if the updating of the constitutional database falls into a failure, it follows that the standby file management subsystem 21' executed on other computer 2 is determined to be the new file management subsystem 21, and hence the file management subsystem oriented monitor subsystem 20 reads the information (i.e., the host name and the port number or the port name) of the standby file management subsystem 21' from the constitutional database (S109). Then, the monitor subsystem 20 notifies the access control subsystem 22 executed on the same computer 2 of the same information (S110).

At this point of time, the access control data 211' of the standby file management subsystem 21' notified of its becoming the new file management subsystem 21 is blank, and, within the metadata 210' thereof, the information about all the blocks in the data area 40 on the secondary storage device 4 are contained in the free area segment 2101', while the information is contained in neither the on-use area segment 2102' nor the on-reserve area segment 2103'. Further, the data files written so far by the access control subsystem 22 on each computer 2 are left in the data area 40 on the secondary storage device 4. Furthermore, the metadata 41 on the secondary storage device 4 is in a status after being updated based on the log data 42 just before the process-down of the original file management subsystem 21.

The standby file management subsystem 21' notified of its functioning as the new file management subsystem 21 from the file management subsystem oriented monitor subsystem 20 mirrors contents of the log data 42 in the metadata 41 on the secondary storage device 4 (S203), at first. As a matter of course, the contents of the log data 42 at that point of time do not necessarily indicate a present condition of the data files in the data area 40.

On the other hand, each access control subsystem 22 notified of the information of the standby file management subsystem 21' becoming the new file management subsystem 21 from the file management subsystem oriented monitor subsystem 20 transmits the procedure for the connecting request to the standby file management subsystem 21' (S301).

The standby file management subsystem 21' requests the access control subsystem 22 that has transmitted the procedure for the connecting request within the limited time, to notify itself of the access control data 221 and the on-use area segment 2201 in the metadata 220. With respect to the access control subsystem 22 which did not transmit the procedure for the connecting request within the limited time, the standby file management subsystem 21 presumes that the process-down etc of the subsystem 22 occur in the subsystem 22, so that this subsystem 22 is excepted from the objects of the processing (S206, S207).

The access control subsystem 22 having received the request to notify the subsystem 21' of the access control data 221 and the on-use area segment 2201 in the metadata 220, notifies the standby file management subsystem 21' of the on-use area segment 2201 in the metadata 220 and the access control data 221 possessed by the subsystem 22 itself (S303).

The standby file management subsystem 21' updates a free area segment 2101' and an on-use area segment 2102' in its own metadata 210' (S210) based on the on-use area segment 2201 received from the access control subsystem 22 within the limited time, and also updates the free area segment 410 and the on-use area segment 411 in the metadata 41 on the secondary storage device 4 (S213). The standby file management subsystem 21' is thereby capable of knowing the blocks in the data area 40 on the secondary storage device 4 which are actually used by the individual existing access control subsystems 22, and the metadata 41 on the secondary storage device 4 becomes correctly coincident with a present condition of the data files in the data area 40. Simultaneously, the standby file management subsystem 21' updates its own access control data 211' in accordance with the access control data 221 of which the access control subsystem 22 has notified (S210). The standby file management subsystem 21' is thereby capable of knowing the tokens possessed by the individual existing access control subsystems 22.

With respect to the access control subsystem 22 which could not transmit the access control data 221 and the on-use area segment 2201 in the metadata 220 within the limited-time, the standby file management subsystem 21 presumes that the process-down of the subsystem 22 occurs, so that this subsystem 22 is excepted from the object of the processing. A write-only token that is not contained in the access control data 221 of which the access control subsystem 22 has notified are newly generated and stored in the self access control data 211' by the standby file management subsystem 21'. With this process, contents of the access control data 211' in the standby file management subsystem 21' match with the access control data 211 in each access control subsystem 22.

Next, the standby file management subsystem 21' extracts all pieces of information contained in the on-reserve area segment 412 in the metadata 41 on the secondary storage device 4 and incorporates the same information into the free area segment 410 (S213).

Subsequently, the standby file management subsystem 21' requests each of the existing access control subsystems 22 to perform a redundant transmission (S214). The access control subsystem 22 having received this request for the redundant transmission transmits to the standby file management subsystem 21' procedures, with respect to which the subsystem 22 does not yet receive reply of completion of processing from the original file management subsystem 21' among the procedures which had been transmitted to the original file management subsystem 21 before this original file management subsystem 21 fell into the process-down (S306), as redundant transmission.

The standby file management subsystem 21' having received the redundant transmission from the access control subsystem 22 checks whether or not a content corresponding to the result of the processing for that redundant transmission exists in the log data 42 on the secondary storage device 4 (S220). If existing therein, the standby file management subsystem 21' judges that the processing is completed before the process-down of the original file management subsystem 21, and transmits a procedure indicating a success back to the access control subsystem 22 (S221). Whereas if the content corresponding to the result of the processing for that redundant transmission does not exist in the log data 42 on the secondary storage device 4, the standby file management subsystem 21' judges that the processing is not completed before the process-down of the original file management subsystem 21, and transmits a procedure indicating a failure back to the access control subsystem 22 (S222). Upon completions of the replies to all the procedures redundantly transmitted, the standby file management subsystem 21' notifies all the existing access control systems 22 that the normal procedure is acceptable (S224). The standby file management subsystem 21' thereby comes to functions as the normal file management subsystem 21 (S225), hereinafter.

The access control subsystem 22 having received the replies to all the redundantly-transmitted procedures manage the procedures with the reply of a failure, as to be retransmitted thereafter (S310). Then, after receiving the notification that the normal procedure is acceptable from the standby file management subsystem 21', the access control subsystem 22 retransmits the procedures which is managed as to be retransmitted to the new file management subsystem 21 (S314). The file management subsystem 21 having received these procedures executes the processing for these retransmitted procedures in accordance with the normal process. With this processing, there disappear the procedures with the unknown result of the processing, and hence it follows that all the procedures conducted between the original file management subsystems 21 and the respective access control subsystems 22 are taken over without any interruption to the new file management subsystems 21.

Further, each access control subsystem 22 deletes all pieces of information contained in the on-reserve area segment 2202 in its own metadata 220 (S304). With this processing, blocks of which the management has been transferred to the access control subsystem 22 by the original file management subsystem 21 are temporarily released from the access control subsystem. Accordingly, the access control subsystem 22, if necessary, requests the new file management subsystem 21 to reserve blocks.

<Modified Example>

Note that the standby file management subsystems 21' are executed on all the computers 2 on which the file management subsystem 21 is executed in the embodiment discussed above, however, another mode may be taken, wherein the standby file management system 21' is executed only one of the computers.

Further, in the embodiment discussed above, if the original file management subsystem 21 falls into the process-down, a standby file management subsystem 21' executed on another computer 2 than the one on which the file management subsystem 21 is executed becomes the new file management subsystem 21, and the standby file management subsystem 21' is rebooted on the computer 2 on which the original file management subsystem 21 is executed. The file management subsystem 21 rebooted on the same computer 2 on which the original file management subsystem 21 is executed may, however, take over the process immediately. In this case, the file management subsystem 21 may be automatically rebooted based on a script or based on an operation by an operator.

Moreover, the scheme in the embodiment discussed above is that the file management subsystem 21 transfers the management of the blocks to the access control subsystem 22 as reserve area, however, the file management subsystem 21 itself may allocate the blocks to data files. In this case, the metadata 220 of the access control subsystem 22 contains not the on-reserve area segment 2202 but only the on-use area segment 2201. Furthermore, in this case, there may be taken such an architecture that the access control subsystem 22 does not have the information of the on-use area segment 2201 in the metadata 220. In this instance, the access control subsystem 22 notifies the standby file management subsystem 21' of only the access control data 221.

As discussed above, according to the data access management system in the distributed processing system of the present invention, if the original management subsystem once falls down, the new management subsystem is capable of immediately knowing the access control data given to the access control subsystem from the original management subsystem. Hence, the distributed processing system as a whole can be immediately restored.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A data access management system in a distributed processing system comprising:
   a plurality of computers connected to each other under a network environment; and
   a shared disk,
   wherein each of said computers has an access control subsystem capable of retaining a write-only token which specifies an area in the shared disk and represents authority to exclusively write data onto a specified area in the shared disk, and a read-only token which specifies an area in the shared disk and represents authority to non-exclusively read data from a specified area in said shared disk, said access control subsystem writes, when retaining a write-only token, data on the area specified by the write-only token, and said access control subsystem reads, when retaining a read-only token, data from the area specified by the read-only token,
   wherein any one of said computers has a management subsystem for uniquely generating a write-only token for every area in the shared disk, respectively issuing the generated write-only tokens for an access control subsystem requesting a write-only token, and generating a read-only token for an area for which no write-only token has been issued and issuing the generated read-only token to an access control subsystem requesting a read-only token, said management subsystem recording which access control subsystem is issued with a write-only token and which area is specified by the same write-only token, and
   wherein at least one of said computers has a standby management subsystem for eliciting, if said management subsystem is incapable of continuing the process, from each of said access control subsystems whether or not it retains a write-only token and which area is specified by its retaining write-only token, generating a write-only token for an area which is specified by no write-only token responded from any access control subsystem and recording which access control subsystem is issued with a write-only token and which area is specified by the same write-only token based on a response to the elicitation from an access control subsystem.

2. A data access management system in a distributed processing system according to claim 1, wherein said management subsystem sets, for said access control subsystem, a part of the storage area of said shared disk as a reserve area that can be allocated to data by said access control subsystem, and said setting of said reserve area includes issuing said write-only token for all blocks in said reserve area.

3. A data access management system in a distributed processing system according to claim 2, wherein said access control subsystem records in an area allocated to the data within the reserve area set by said management subsystem as an on-use area, and notifies said management subsystem of information about the on-use area,
   wherein said management subsystem records the information about the on-use area of which said access control subsystem has notified, and
   wherein said standby management subsystem, if said management subsystem is incapable of continuing the process, requests each of said access control subsystem for the information about the on-use area that is recorded by said access-control subsystem, and records the information about the on-use area of which said access control subsystem has notified in response to this request.

4. A data access management system in a distributed processing system according to claim 3, wherein said shared disk retains management information indicating, for every block in the storage area, that it is set as reserve area for any one of said access control subsystems, that it is an on-use area allocated to data by any one of said access control subsystems or that it is a free area, and log data recorded with a history of updating the management data,
   wherein said management subsystem, each time it sets the reserve area and each time it is notified of the information about the on-use area, records the facts in the log data, and
   wherein said standby management subsystem, if said management subsystem is incapable of continuing the process, updates the management information on the basis of the log data.

5. A data access management system in a distributed processing system according to claim 4, wherein said standby management subsystem, if said management subsystem is incapable of continuing the process, makes each of said access control subsystems execute a redundant transmission of a procedure transmitted by said access control subsystem to said management subsystem.

6. A data access management system in a distributed processing system according to claim 5, wherein said standby management subsystem, if the log data contains a content corresponding to the procedure redundantly transmitted from said access control subsystem, replies that this procedure succeeds to said access control subsystem, and, if the log data does not contain the content corresponding to the procedure redundantly transmitted from said access control subsystem, replies that this procedure falls into a failure to said access control subsystem.

7. A data access management system in a distributed processing system according to claim 1, wherein any one of said computers includes a monitor subsystem for monitoring an operation of said management subsystem and, when detecting that said management subsystem is incapable of continuing the process, operating said standby management subsystem.

8. A data access management system in a distributed processing system according to claim 7, wherein each of said computers includes said standby management subsystem, said monitor subsystem, when detecting that said management subsystem is incapable of continuing the process, operates only one of said standby management subsystems.

* * * * *